United States Patent
Ihara et al.

(10) Patent No.: US 7,317,383 B2
(45) Date of Patent: Jan. 8, 2008

(54) ALERT SYSTEM INSTALLED IN VEHICLE

(75) Inventors: Toru Ihara, Tokyo (JP); Keiichi Yamamoto, Tokyo (JP)

(73) Assignee: Mitsubishi Fuso Truck and Bus Corporation, Tokyo (JP)

(*) Notice: Subject to any disclaimer, the term of this patent is extended or adjusted under 35 U.S.C. 154(b) by 243 days.

(21) Appl. No.: 11/256,212

(22) Filed: Oct. 24, 2005

(65) Prior Publication Data
US 2006/0103513 A1 May 18, 2006

(30) Foreign Application Priority Data
Oct. 22, 2004 (JP) ............................. 2004-308009

(51) Int. Cl.
*B60Q 1/00* (2006.01)
(52) U.S. Cl. ...................... 340/435; 340/438; 340/439; 340/576; 340/903; 348/148; 455/345
(58) Field of Classification Search ................ 340/435, 340/436, 438, 439, 575, 576, 903, 902, 937; 348/148, 152; 455/345, 569.2; 379/428.01; 280/734, 735; 180/273, 274; 701/33
See application file for complete search history.

(56) References Cited

U.S. PATENT DOCUMENTS 6,262,657 B1 * 7/2001 Okuda et al. ............... 340/439
6,819,261 B2 * 11/2004 Nishiwaki et al. .......... 340/903
2002/0169529 A1 * 11/2002 Kim ............................. 701/33

FOREIGN PATENT DOCUMENTS

| JP | 2000 355230 | 12/2000 |
|----|-------------|---------|
| JP | 2002 046542 | 2/2002  |
| JP | 2003 348193 | 12/2003 |

* cited by examiner

*Primary Examiner*—Anh V. La
(74) *Attorney, Agent, or Firm*—Jacobson Holman PLLC

(57) ABSTRACT

With the intention of issuing an alert responsive to judgment of dozing at wheel or deviation from the lane, there is provided an alert system installed in a vehicle including driving state detecting device for detecting driving state of the vehicle; a mobile telephone including a camera; holding device for detachably holding the mobile telephone in an interior of the vehicle such that the camera is able to acquire an image ahead of the vehicle; and alert issuing device for issuing an alert from the mobile telephone based on the image ahead of the vehicle obtained by the camera and the driving state detected by the driving state detecting device.

11 Claims, 2 Drawing Sheets

IMAGE AHEAD OF VEHICLE

ALERT SYSTEM INSTALLED IN VEHICLE

BACKGROUND OF THE INVENTION

1. Field of the Invention

The present invention relates to an alert system installed in a vehicle which is preferably applied to an alert device that issues an alert to a driver when dozing at wheel or deviation from the lane is detected in order to draw the attention of the driver.

2. Description of the Related Art

Conventionally, there has been proposed an alert system (see Japanese Patent Application Laid-Open No. 2002-46542) for acquiring an image ahead of the vehicle by a camera, calculating a lateral position (lateral deviation with respect to the lane) of the vehicle from the result of image processing such as road lane recognition, deriving the degree of less alertness of the driver and the possibility of lane deviation from vehicle speed, steering wheel angle, accelerator depression amount, brake pedal on-off state, cultch operation state, transmission shift position, and flasher lever operation state, and issuing an alert through a speaker or a monitor to the driver in accordance with the result of the deriving.

However, a conventional system is formed by three main devices of a camera, a controller (ECU) and an alert issuing device (a speaker or a monitor). Therefore, it has been difficult to install these devices in a vehicle which is not equipped with an alert system afterwards to realize an alert system.

With the foregoing problem in view, the object of the present invention is to provide an alert system that can be installed in a vehicle with ease.

SUMMARY OF THE INVENTION

To attain the above object, as a first generic feature, there is provided an alert system installed in a vehicle comprising: driving state detecting means for detecting driving state of the vehicle; a mobile telephone including a camera; holding means for detachably holding the mobile telephone in an interior of the vehicle such that the camera is able to acquire an image ahead of the vehicle; and alert issuing means for issuing an alert from the mobile telephone based on the image ahead of the vehicle obtained by the camera and the driving state detected by the driving state detecting means.

As second generic feature there is provided an alert system installed in a vehicle comprising: driving state detecting means for detecting driving state of the vehicle; a mobile telephone including a camera; holding means for detachably holding the mobile telephone in an interior of the vehicle such that the camera is able to acquire an image ahead of the vehicle; attention estimating means for estimating an attention of a driver of the vehicle based on the image ahead of the vehicle acquired by the camera and the driving state detected by the driving state detecting means; and alert issuing means for issuing, if the attention estimating means judges that the attention of the driver is low, an alert from the mobile telephone.

As a third generic feature, there is provided an alert system installed in a vehicle comprising: driving state detecting means for detecting driving state of the vehicle; a mobile telephone including a camera; holding means for detachably holding the mobile telephone in an interior of the vehicle such that the camera is able to acquire an image ahead of the vehicle; lane deviation monitoring means for monitoring, based on the image ahead of the vehicle acquired by the camera and the driving state detected by the driving state detecting means, whether or not the vehicle deviates from a lane on which the vehicle is traveling; and alert issuing means for issuing, if the lane deviation monitoring means determines or predicts that the vehicle deviates from the lane, an alert from the mobile telephone.

As a fourth generic feature, there is provided an alert system installed in a vehicle comprising: driving state detecting means for detecting driving state of the vehicle; a mobile telephone including a camera; holding means for detachably holding the mobile telephone in an interior of the vehicle such that the camera is able to acquire an image ahead of the vehicle; attention estimating means for estimating an attention of a driver of the vehicle based on the image ahead of the vehicle acquired by the camera and the driving state detected by the driving state detecting means; lane deviation monitoring means for monitoring, based on the image ahead of the vehicle acquired by the camera and the driving state detected by the driving state detecting means, whether or not the vehicle deviates from a lane on which the vehicle is traveling; and alert issuing means for issuing, if the attention estimating means judges that the attention of the driver is low or the lane deviation monitoring means determines or predicts that the vehicle deviates from the lane, an alert from the mobile telephone.

According to an alert system installed in vehicle in the present invention, such a simple configuration utilizing a mobile telephone equipped with a camera advantageously formulate a system for alert against dozing at wheel or deviation from the lane. Therefore, the present alert system can be easily installed in a vehicle without an alert system. The present system can be realized without depending on the type nor the provider of a mobile telephone, so that it is possible to provide a versatile alert system at a low cost. Fixing the mobile telephone by holding means makes it possible to avoid displacement of the camera.

As a preferable feature, the mobile telephone may further includes current position recognizing means that is able to recognize a current position of the vehicle; and if the attention estimating means judges that the attention of the driver is low or the lane deviation monitoring means determines or predicts that the vehicle deviates from the lane, the current position recognizing means may recognize the current position where the vehicle is at that time.

As another preferable feature, if the attention estimating means judges that the attention of the driver is low or the lane deviation monitoring means determines or predicts that the vehicle deviates from the lane, the mobile telephone may sends the current position recognized by the current position recognizing means to a management facility of the vehicle.

With this configuration, since the current position of the vehicle is stored when the attention of the driver is judged to be low or the deviation from the lane is detected or predicted, locations where drivers tend to less alert or where vehicles tend to deviate from the lane can statistically estimated.

Further, since, when the attention of the driver is judged to be low or the deviation from the lane is detected or predicted, the current position of the vehicle is stored and concurrently the content and the current positions are sent to the management facility, also the management facility can recognize locations where drivers tend to less alert or where vehicles tend to deviate from the lane by analyzing data accumulated.

The system may issue an alert when a vehicle approaches such a location where drivers tend to become less alert or where vehicles tend to deviate from the lane to improve safety. When the vehicle approaches such a location, the management facility makes a call to the driver in order to regain the attention of the driver. This manner further enhances safety in driving. Specifically, conversation is effective to regain attention, and speaking to the driver from the management facility can regain the less attention of the driver.

As an additional feature, if the attention estimating means judges that the attention of the driver is low, permission for and prohibition against incoming call reception, conversation, or mail reception over the mobile telephone may be changed over.

As a further preferable feature, if the lane deviation monitoring means determines or predicts that the vehicle deviates from the lane, permission for and prohibition against incoming call reception, conversation, or mail reception over the mobile telephone may be changed over.

With these configurations, the driver is not annoyed by the ringtone of the mobile telephone while the driver must pay further attention to driving, for example, when the driver becomes less alert or the vehicle deviates from the lane.

Other objects and further features of the present invention will be apparent from the following detailed description when read in conjunction with the accompanying drawings.

DESCRIPTION OF THE PREFERRED EMBODIMENTS

A preferred embodiment of the present invention will now be described with reference to the accompanying drawings.

Figure 1:
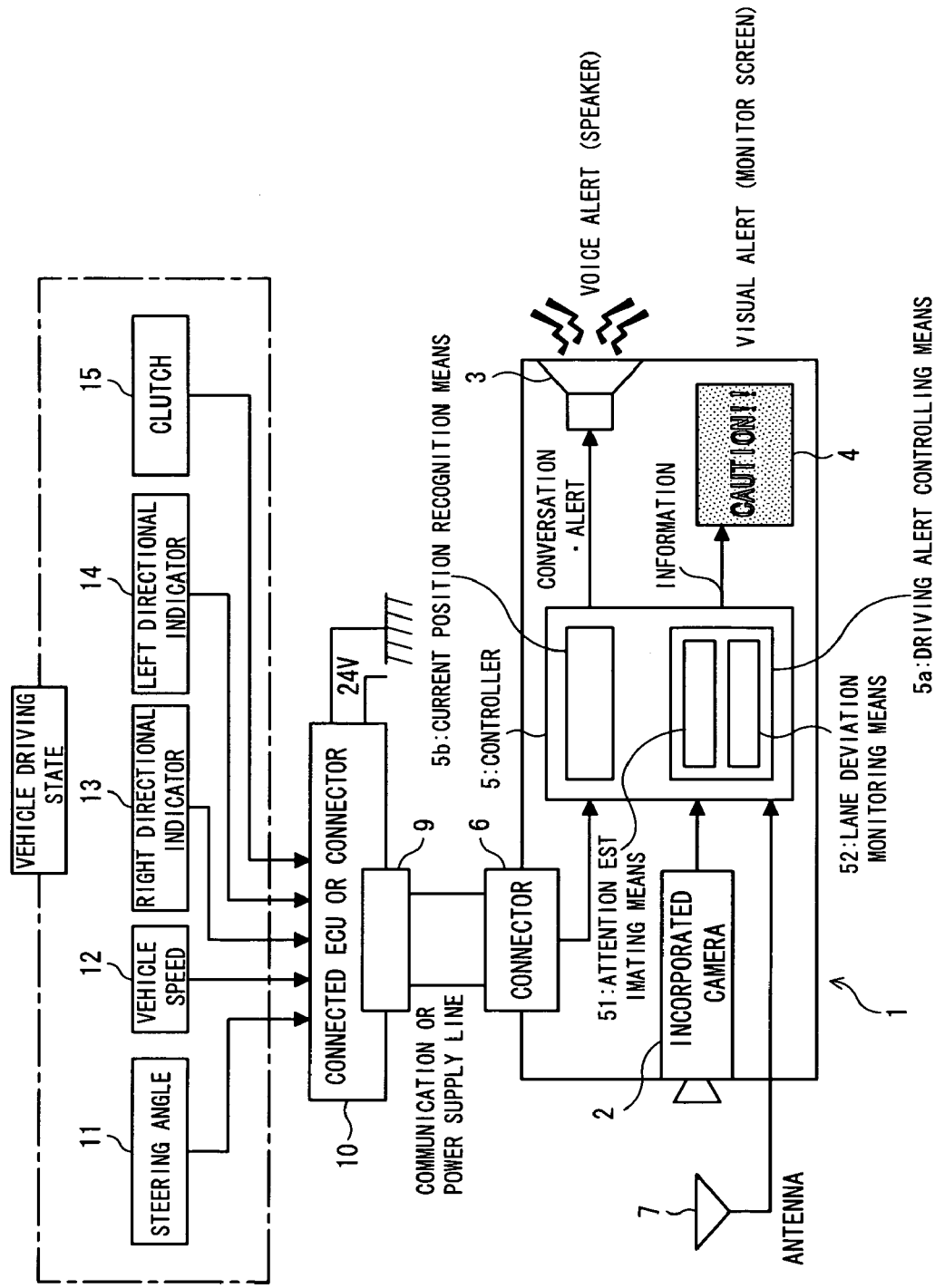
FIG. 1 is a block diagram schematically showing the main part of an alert system installed in a vehicle according to an embodiment of the present invention.
Figure 3:
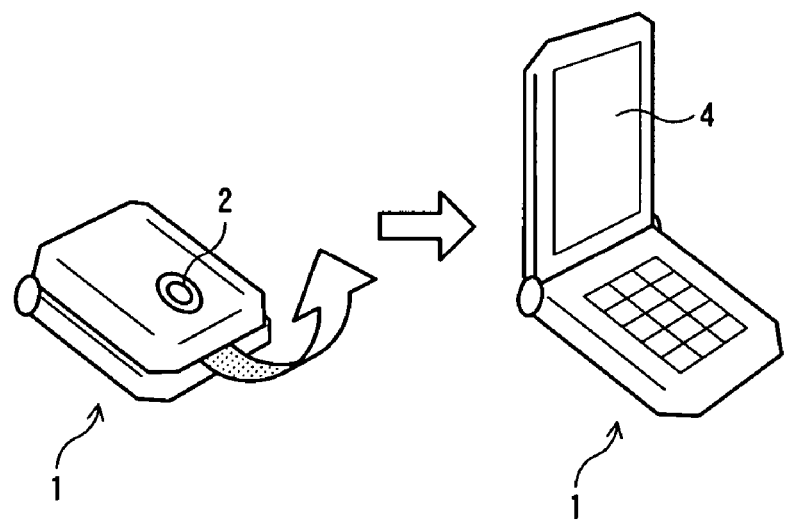
FIG. 3 is a schematic diagram illustrating a mobile telephone used in the alert system of FIG. 1.

In FIGS. 1 and 3, symbol 1 represents a mobile telephone; symbol 2 represents a camera incorporated in the mobile telephone 1; and symbols 3 and 4 represent a speaker (omitted in FIG. 3) and a monitor (or a display unit) similarly incorporated in the mobile telephone 1, respectively (the speaker 3 is however omitted in FIG. 3). The speaker 3 and the monitor 4 function as an alert issuing means for issuing an alert to the driver.

As shown in FIG. 1, the mobile telephone 1 includes controlling means (controller) 5 for carrying out data processing of various kinds. The controller 5 includes a central processing unit (CPU) for performing various arithmetic operations, a storage (a RAM, a ROM) in which a number of control programs are stored, an input/output device, a timer and other units, but these units included in the controller 5 is not shown in detail in the accompanying drawings. In the present embodiment, various operations concerning alert issuing are carried out by the controller 5 in the mobile telephone 1.

Further, the mobile telephone 1 has a connector 6. The connection of the connector 6 to a connector 9 on the vehicle side supplies the mobile telephone 1 with power from the vehicle and concurrently exchanges various data pieces between the vehicle and the mobile telephone 1. In the illustrated example, the vehicle and the mobile telephone 1 exchanges various data pieces by means of multiplex communication through a CAN (Controller Area Network) bus. The vehicle in the present embodiment is a commercial vehicle such as a truck which collects and derivers loads.

Figure 2:
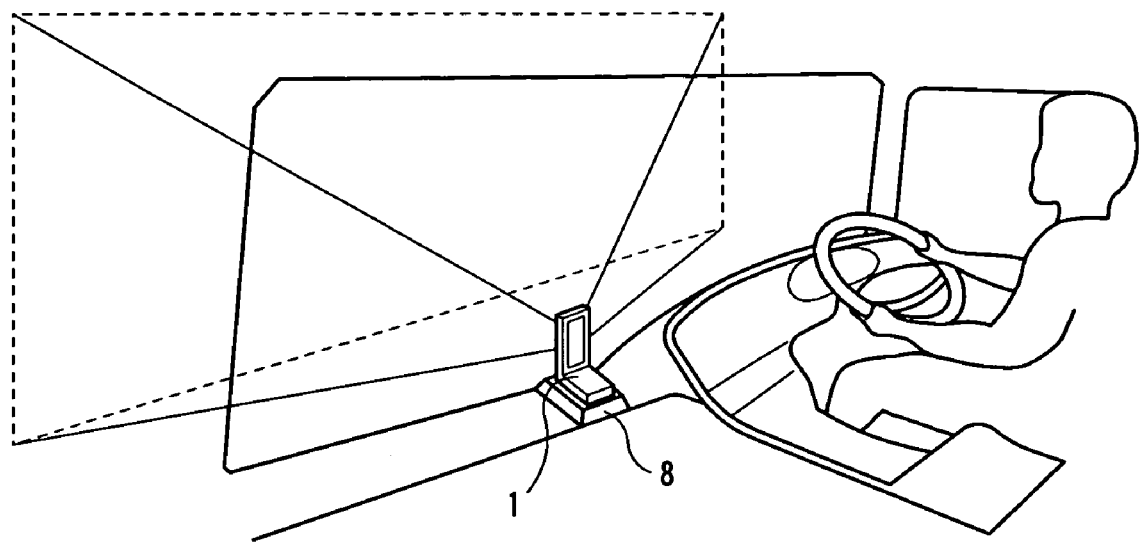
FIG. 2 is a schematic diagram illustrating an interior of the vehicle in which the alert system of FIG. 1 is installed.

As shown in FIG. 2, a holder (holding means) 8 for detachably holding the mobile telephone 1 is installed in the interior of the vehicle. For example, the holder 8 is fixed to the dashboard with a two-sided tape or the like. The mobile telephone 1 is fixed to the holder 8 such that the camera 2 incorporated in the mobile telephone 1 is arranged at a suitable position for acquiring image ahead of the vehicle. The holder 8 may be formed correspondingly to the type of the mobile telephone 1 or may be formed not depending on a type of mobile telephone 1. If the holder 8 is formed correspondingly to the type of the mobile telephone 1, merely mounting the mobile telephone 1 onto the holder 8 positively fixes and holds the mobile telephone 1. Conversely, if the holder 8 is formed for all types(general purpose), a process for positively fixing the mobile telephone 1 to the holder 8 is additionally required, but the holder 8 can fix mobile telephone 1 of any type.

In the meanwhile, the connector 9 of the vehicle is connected to a vehicle ECU (control unit) 10. To the ECU 10 are connected a steering angle sensor 11 for measuring a steering angle of the steering wheel that is a steering handling state of the steering, a speed sensor 12 for measuring the traveling speed of the vehicle, flasher switches 13, 14 for detecting operation states of left and right flasher respectively, and a clutch sensor 15 for detecting an operation state of the clutch. The driving states and/or driving information (vehicle information) detected by these sensors 11-15 are input to the ECU 10.

Additionally, however not illustrated, an accelerator opening sensor for measuring the amount of accelerator opening or the amount of depression of the accelerator, a brake sensor for detecting an on-off state of a brake pedal, and a sensor for obtaining a shift position of the transmission are connected to the ECU 10. These sensors 11-15 and the non-illustrated sensors serve to function as driving state detecting means for detecting driving state of the vehicle.

The same control program as that used in a conventional vehicle alert system has been previously installed in the controller 5 of the mobile telephone 1. Specifically, the control program may be a program which executes controls disclosed by the above-mentioned Patent Reference 1 or may be other control software known to the public.

The mobile telephone 1 of the present invention is different from a normal mobile telephone equipped with a camera on the point of previous installation of such control software in the controller 5. In other words, a normal mobile telephone with a camera can be applied to the present system if a known control program is installed in the telephone.

Such a control program (control software) serves as driving alert controlling means 5a in the controller 5. The driving alert controlling means 5a issues an alert to the driver in accordance with a driving state of the driver and/or a running state of the vehicle. In the present embodiment, the driving alert controlling means 5a retains attention estimating means 51 for estimating an attention of the driver and issuing an alert if the attention of the driver becomes less, and lane deviation monitoring means 52 for recognizing the white lines by processing an image ahead of the vehicle acquired by the camera 2, recognizing the lane on which the vehicle is traveling and issuing an alert if the vehicle is about to deviate from the lane.

The attention estimating means 51 estimates an attention of the driver based on the image of the road ahead of the vehicle acquired by the camera 2 and various driving state of the vehicle detected by the various sensors. For example, upon judgment that the vehicle is meandering based on white lines position data obtained from the road image acquired by the camera 2 and steering handling information obtained by the steering angle sensor 11, the attention estimating means 51 further judges whether or not the meandering is caused by dozing at wheel of the driver based on the flusher switch operating information obtained by the flasher switches 13 and 14 and concurrently judges an degree of the dozing (an degree of less attention) based on the largeness of the meandering in order to issue an alert sound or an alert display corresponding to the judged degree through the speaker 3 or the monitor 4, respectively.

The lane deviation monitoring means 52 judges whether or not the vehicle is about to deviate from the lane based on the image ahead of the vehicle obtained by the camera 2. For example, if the vehicle is about to deviate from the lane without operation on a flusher switch, the lane deviation monitoring means 52 issues an alert sound or an alert display corresponding to the amount of lateral deviation from the lane through the speaker 3 or the monitor 4, respectively.

The attention estimating means 51 and the lane deviation monitoring means 52 can be realized by any conventional known method, so detailed description is omitted here.

In the present embodiment, the mobile telephone 1 has the GPS (Global Positioning System) function, which enables the mobile telephone 1 to obtain the precise current position of the vehicle. For this purpose, the controller 5 includes a current position recognition means 5b for receiving signals transmitted from a number of artificial satellites and recognizing the latitude and the longitude of the position where the signals have been received. The controller 5 is able to correlate with the current position obtained by the current position recognition means 5b with map data retained in the non-illustrated storage and display the current position on a map displayed on the monitor 4.

If the attention estimating means 51 judges that the driver's attention becomes less or the lane deviation monitoring means 52 predicts deviation of the vehicle from the lane, the controller 5 issues an alert to the driver by means of the alert issuing means such as the speaker 3 or the monitor 4 and, at the same time, recognizes the position where the alert is issued, so that the content of the alert and the position where the alert issued are stored in the non-illustrated storage.

At that time, the two information pieces of the content of the alert and the position where the alert issued are sent to a management center of the vehicle using the communication function of the mobile telephone 1. The management center manages, for example, running information exemplified by starting time, destination, running distance and fuel to be used, and also manages future running schedule.

With the configuration described above, the operation of the present alert system installed in a vehicle begins with mounting the mobile telephone 1 with a camera 2 on the holder to fix the mobile telephone 1 in such a posture that the camera 2 is able to acquire an image ahead of the vehicle.

Subsequently, the connector 9 on the vehicle is connected to the connecter 6 on the mobile telephone 1 via a cable. In this event, if the communication protocol, the specific voltage and others are complied with the vehicle communication standard CAN, the mobile telephone 1 can be connected directly to the CAN bus on the vehicle by a simple conversion connector.

On the basis of information detected by various sensors of the vehicle and the image data acquired by the camera 2, the attention estimating means 51 estimates the degree of the attention of the driver and the lane deviation monitoring means 52 monitors whether or not the vehicle deviates or is about to deviates from the lane in the controller 5 of the mobile telephone 1.

If the attention estimating means 51 estimates or judges that the driver's attention becomes less, the attention estimating means 51 issues an alert sound in accordance with the degree of the less attention from the speaker 3 of the mobile telephone 1 to draw the attention of the driver. For example, the present embodiment classifies a less attention degree into three levels of "small", "medium", and "large". The speaker 3 issues a preliminary alert "Aren't you tired?", a primary alert "Please be cautious about driving", and a secondary alert "please take a rest" in the order of smaller degree of less attention of the driver.

Further, if the lane deviation monitoring means 52 detects or predicts that the vehicle deviates from the lane, the lane deviation monitoring means 52 issues a lane deviation alert such as "Please be cautious about the steering operation" from the speaker 3. Other than the above voice alert, an alert having the corresponding contents to the voice alert is displayed on the monitor 4 of the mobile telephone 1.

As alternative to such a voice alert, a ringtone, and a ringing melody previously stored in the mobile telephone 1 may be used as an alert. In this case, a ringtone and a ringing melody may be varied with the degree of less alertness of the driver or the volume of the alert may be varied with the degree of less alertness. Alternatively, for an alert sound, the driver may arbitrarily select one from voice, a ringtone, and a ringing melody. In such a setting, the driver can discriminate an alert sound from a normal ringtone. Further alternatively, permission for and prohibition against incoming call reception, conversation, or mail reception over the mobile telephone 1 may be changed over in accordance with a degree of less attention of the driver.

On the basis of the vehicle operation data from the driving state detecting means exemplified by the flusher switches 13, 14 and others, the present system may judge whether or not the vehicle is running and, if the result of the judgment is positive, may inhibit call reception of the mobile telephone 1 regardless of an alert to be issued concerning the driving. With this configuration, call reception of the mobile telephone 1 can be surely inhibited whereupon disturbance of driving due to call reception can be avoided.

Information concerning results of estimation and judgment in the attention estimating means 51 and the lane deviation monitoring means 52 and an alert issued from the speaker 3 is stored in the storage of the controller 5 and is concurrently sent to ECU 10 of the vehicle through the CAN bus so that the information is stored also in the vehicle side.

When such an alert is issued, the current position recognition section 5b recognizes and retains the position where the alert is issued, and sends the content of the alert and the recognized position to the management center of the vehicle. The management center accumulates information concerning alerts that have been issued.

The alert system installed in a vehicle of the present invention can advantageously alert for dozing at wheel and deviation from the lane with a simple configuration, and can be realized simply be installing a control program in the mobile telephone 1 with a camera.

If the control program that is used in a vehicle alert system is previously installed in mobile telephone 1 with a camera, the present system can be formulate without depending on the type nor on the provider of the mobile telephone so that a highly versatile alert system can be provided with a low cost.

Since the mobile telephone 1 is fixed to the holder 8, displacement of the camera 2 can be avoided.

If the driver selects a ringtone or a ringing melody for an alert sound, the driver is not annoyed by an alert sound anymore. The wire connection between the mobile telephone 1 and the vehicle through a cable enables the mobile telephone 1 to definitely obtain the driving information (vehicle information) of the vehicle and surely supplies the mobile telephone 1 with power.

Since, when the attention of the driver is judged to be low or the vehicle is judged or predicted to deviate from the lane, the current position at that time is recognized and stored, it is possible to statistically estimate locations where drivers tend to become less alert or where vehicles tend to deviate from the lane. The system may issue an alert when a vehicle approaches such a location where drivers tend to become less alert or where vehicles tend to deviate from the lane to improve safety.

For example, when the above preliminary alert is issued to a driver, the management center makes a call to the driver in order to regain the attention of the driver. This manner further enhances safety in driving. Specifically, conversation is effective to regain attention, and speaking to the driver from the management center can regain the less attention of the driver.

When an alert is issued, the content of the alert and the position where the alert is issued are automatically sent to the management center. As a result of analyzing accumulated data concerning issued alerts, the management center can previously recognize locations at which alerts are frequently issued. Alternatively, the management center may send an alert e-mail to a vehicle approaching a location where alerts are frequently issued. Advantageously, with this configuration, the present system can further improve the safety of the vehicle.

In the event of an actual accident, the present system can analyze the cause of the accident based on the image data, the vehicle information and the position data at occurrence of the accident whereupon the analyzed data can be helpfully used for prevention of future accidents. The images taken by the camera 2 can be used as objective data of the accident.

Further, the present invention should by no means be limited to this embodiment, and various changes or modifications may be suggested without departing from the gist of the invention. For example, in the above embodiment, the mobile telephone is wiredly connected to the vehicle by a cable, considering certainty in collection of vehicle information and in power supply to the mobile telephone 1. Alternatively, the mobile telephone is connected to a LAN in the vehicle by wireless communication technique such as Bluetooth to collect the vehicle information.

The present alert system may be formed only by the mobile telephone 1 which is not connected either in a wired or wireless manner. In other words, the alert system may function based only on image data acquired by the camera 2 not on vehicle information. Conversely, if the alert system detects a sudden variation in vehicle speed (a sudden behavior change) caused by abrupt steering when the mobile telephone 1 is connected to the vehicle, the system may issue an alert to the driver regardless of the image acquired by the camera 2 to notify a danger.

Further, the present embodiment issues an alert when the controller 5 judges that the driver becomes less attention or judges or predicts that the vehicle deviates from the lane. Alternatively, the present system can be applied to a system for issuing alert in order to keep a substantially constant distance between the vehicle in question and the vehicle in front.

What is claimed is:

1. An alert system installed in a vehicle comprising:
   driving state detecting means for detecting driving state of the vehicle;
   a mobile telephone including a camera;
   holding means for detachably holding said mobile telephone in an interior of the vehicle such that said camera is able to acquire an image ahead of the vehicle; and
   alert issuing means for issuing an alert from said mobile telephone based on the image ahead of the vehicle obtained by said camera and the driving state detected by said driving state detecting means.

2. An alert system installed in a vehicle according to claim 1, wherein:
   said mobile telephone further includes current position recognizing means that is able to recognize a current position of the vehicle; and
   if said alert issuing means issues the alert, said current position recognizing means recognizes the current position where the vehicle is at that time.

3. An alert system installed in a vehicle comprising:
   driving state detecting means for detecting driving state of the vehicle;
   a mobile telephone including a camera;
   holding means for detachably holding said mobile telephone in an interior of the vehicle such that said camera is able to acquire an image ahead of the vehicle;
   attention estimating means for estimating an attention of a driver of the vehicle based on the image ahead of the vehicle acquired by said camera and the driving state detected by said driving state detecting means; and
   alert issuing means for issuing, if said attention estimating means judges that the attention of the driver is low, an alert from said mobile telephone.

4. An alert system installed in a vehicle according to claim 3, wherein:
   said mobile telephone further includes current position recognizing means that is able to recognize a current position of the vehicle; and
   if said attention estimating means judges that the attention of the driver is low, said current position recognizing means recognizes the current position where the vehicle is at that time.

5. An alert system according to claim 3, wherein if said attention estimating means judges that the attention of the driver is low, permission for and prohibition against incoming call reception, conversation, or mail reception over said mobile telephone are changed over.

6. An alert system installed in a vehicle comprising:
   driving state detecting means for detecting driving state of the vehicle;
   a mobile telephone including a camera;
   holding means for detachably holding said mobile telephone in an interior of the vehicle such that said camera is able to acquire an image ahead of the vehicle;
   lane deviation monitoring means for monitoring, based on the image ahead of the vehicle acquired by said camera and the driving state detected by said driving state detecting means, whether or not the vehicle deviates from a lane on which the vehicle is traveling; and
   alert issuing means for issuing, if said lane deviation monitoring means determines or predicts that the vehicle deviates from the lane, an alert from said mobile telephone.

7. An alert system installed in a vehicle according to claim 6, wherein:
   said mobile telephone further includes current position recognizing means that is able to recognize a current position of the vehicle; and
   if said lane deviation monitoring means determines or predicts that the vehicle deviates from the lane, said current position recognizing means recognizes the current position where the vehicle is at that time.

8. An alert system according to claim 6, wherein if said lane deviation monitoring means determines or predicts that the vehicle deviates from the lane, permission for and prohibition against incoming call reception, conversation, or mail reception over said mobile telephone are changed over.

9. An alert system installed in a vehicle comprising:
   driving state detecting means for detecting driving state of the vehicle;
   a mobile telephone including a camera;
   holding means for detachably holding said mobile telephone in an interior of the vehicle such that said camera is able to acquire an image ahead of the vehicle;
   attention estimating means for estimating an attention of a driver of the vehicle based on the image ahead of the vehicle acquired by said camera and the driving state detected by said driving state detecting means;
   lane deviation monitoring means for monitoring, based on the image ahead of the vehicle acquired by said camera and the driving state detected by said driving state detecting means, whether or not the vehicle deviates from a lane on which the vehicle is traveling; and
   alert issuing means for issuing, if said attention estimating means judges that the attention of the driver is low or said lane deviation monitoring means determines or predicts that the vehicle deviates from the lane, an alert from said mobile telephone.

10. An alert system installed in a vehicle according to claim 9, wherein:
    said mobile telephone further includes current position recognizing means that is able to recognize a current position of the vehicle; and
    if said attention estimating means judges that the attention of the driver is low or said lane deviation monitoring means determines or predicts that the vehicle deviates from the lane, said current position recognizing means recognizes the current position where the vehicle is at that time.

11. An alert system installed in a vehicle according to claim 10, wherein if said attention estimating means judges that the attention of the driver is low or said lane deviation monitoring means determines or predicts that the vehicle deviates from the lane, the mobile telephone sends the current position recognized by said current position recognizing means to a management facility of the vehicle.

* * * * *